(12) United States Patent
Bahar et al.

(10) Patent No.: US 10,749,201 B2
(45) Date of Patent: Aug. 18, 2020

(54) REGENERATIVE FUEL CELL (71) Applicant: Xergy Inc., Georgetown, DE (US)

(72) Inventors: Bamdad Bahar, Georgetown, DE (US);
Jacob Zerby, Harbeson, DE (US);
Scott Fackler, Harrington, DE (US)

(73) Assignee: Xergy Inc., Harrington, DE (US)

( * ) Notice: Subject to any disclaimer, the term of this patent is extended or adjusted under 35 U.S.C. 154(b) by 0 days.

(21) Appl. No.: 16/056,116

(22) Filed: Aug. 6, 2018

(65) Prior Publication Data

US 2018/0351193 A1 Dec. 6, 2018

Related U.S. Application Data

(63) Continuation-in-part of application No. 15/403,299, filed on Jan. 11, 2017, now abandoned.

(60) Provisional application No. 62/541,605, filed on Aug. 4, 2017.

(51) Int. Cl.

| | |
|---|---|
| *H01M 8/18* | (2006.01) |
| *H01M 8/1004* | (2016.01) |
| *C01B 3/06* | (2006.01) |
| *H01M 8/04089* | (2016.01) |
| *H01M 8/04082* | (2016.01) |
| *H01M 8/04007* | (2016.01) |
| *C01B 3/00* | (2006.01) |
| *H01M 8/1018* | (2016.01) |

(52) U.S. Cl.
CPC .......... *H01M 8/186* (2013.01); *C01B 3/0031* (2013.01); *C01B 3/065* (2013.01); *H01M 8/04007* (2013.01); *H01M 8/04067* (2013.01); *H01M 8/04089* (2013.01); *H01M 8/04216* (2013.01); *H01M 8/1004* (2013.01); *H01M 8/04201* (2013.01); *H01M 2008/1095* (2013.01)

(58) Field of Classification Search
CPC .............. H01M 8/186; H01M 8/1004; H01M 8/04089; H01M 8/04216; H01M 8/04007; H01M 8/04201; H01M 2008/1095; H01M 8/04067; C01B 3/065; C01B 3/0031
See application file for complete search history.

(56) References Cited

U.S. PATENT DOCUMENTS

| | | | | |
|---|---|---|---|---|
| 2004/0185313 A1* | 9/2004 | Halter | ............... | H01M 8/04156 429/418 |
| 2005/0175894 A1* | 8/2005 | Visco | .................. | H01M 2/1673 429/212 |
| 2007/0287059 A1* | 12/2007 | Eickhoff | ............... | H01M 8/186 429/62 |

(Continued)

*Primary Examiner* — Emmanuel E Duke
(74) *Attorney, Agent, or Firm* — Invention to Patent Services; Alex Hobson (57) ABSTRACT

A regenerative fuel cell produces hydrogen that is stored in a reservoir on the storage side of a membrane electrode assembly when operating in a hydrogen pumping mode and this stored hydrogen is reacted and moved back through the membrane electrode assembly to form water when operating in a fuel cell mode. A metal hydride forming alloy may be configured in the hydrogen storage reservoir and may be coupled to the membrane electrode assembly. An integral metal hydride electrode having a metal hydride forming alloy may be configured on the storage side of the membrane electrode assembly and may have a catalyst or an ion conductive media incorporated therewith.

21 Claims, 9 Drawing Sheets

(56) References Cited

U.S. PATENT DOCUMENTS

| | | | | |
|---|---|---|---|---|
| 2008/0067061 A1* | 3/2008 | Zuber | ............... | C25B 9/10 |
| | | | | 204/290.08 |
| 2008/0289955 A1* | 11/2008 | Balestrino | ............ | C25B 1/04 |
| | | | | 204/274 |
| 2012/0299384 A1* | 11/2012 | Peled | ............... | H01M 4/9083 |
| | | | | 307/77 |
| 2014/0017580 A1* | 1/2014 | Munier | ............ | H01M 8/04216 |
| | | | | 429/410 |
| 2014/0072836 A1* | 3/2014 | Mills | ............... | C25B 1/04 |
| | | | | 429/8 |
| 2015/0211132 A1* | 7/2015 | MacKinnon | ....... | H01M 8/2483 |
| | | | | 429/422 |
| 2016/0024666 A1* | 1/2016 | Bahar | ............... | C25B 1/12 |
| | | | | 205/338 |
| 2016/0133970 A1* | 5/2016 | Yamamoto | ....... | H01M 8/04753 |
| | | | | 429/444 |

\* cited by examiner

REGENERATIVE FUEL CELL

CROSS REFERENCE TO RELATED APPLICATIONS

This application is a continuation in part of U.S. patent application Ser. No. 15/403,299, filed on Jan. 11, 2017, entitled, Advanced Metal Hydride Heat Transfer Systems Utilizing An Electrochemical Compressor and currently pending, and this application claims the benefit of U.S. provisional patent application No. 62/541,605, filed on Aug. 4, 2017 and entitled, Regenerative Fuel Cell; the entirety of both applications is hereby incorporated by reference herein.

STATEMENT OF GOVERNMENT LICENSE RIGHTS

This invention was made with government support under Department of Energy grant DE-SC0015923. The government has certain rights in the invention.

BACKGROUND OF THE INVENTION

Background

The present invention relates to a regenerative fuel cell, wherein a single cell acts as both an electrolyzer and as a fuel cell, and hydrogen is generated from a fluid stream and particularly from a gas stream, such as air.

Conventionally, regenerative fuel cells are run with liquid water on the anode during electrolysis hydrogen generation mode. Water is fed to the anode side of the cell, a voltage is applied to the cell, and the water is split causing protons to travel through the ion exchange media and oxygen to be released from the anode. The protons recombine with electrons to form hydrogen on the cathode side, and the hydrogens are stored either as high pressure gas or as a metal hydride. A load is then hooked up to the system, and the hydrogen that was stored in the cathode side, now the anode side of the fuel cell, during electrolysis form protons, which travel through the ion exchange media, and electrons. Oxygen is fed on the cathode side of the fuel cell and recombines with the protons and electrons to form water and energy. The cell is run reversibly to both produce and consume hydrogen, which leads to catalyst instability. There are also issues of flooding the hydrogen generation side.

Generating hydrogen from moisture in the air remedies both issues. Liquid water is not in contact with the reversible catalyst, which reduces the degradation and improves the lifetime of the system. Flooding of the cathode is not an issue, as water is limited when utilizing moisture in the air.

SUMMARY OF THE INVENTION

An exemplary regenerative fuel cell may have extended life and be less prone to flooding by reacting with a gas as opposed with a fluid source. Humidity from ambient air or an air stream may be reacted on the source side of the membrane electrode assembly to produce and pump hydrogen to the storage side of the membrane electrode assembly. Utilizing a gas stream reduces flooding and improves the life of the catalyst of the electrodes in the membrane electrode assembly. Hydrogen pumped by the regenerative fuel cell may be stored in hydrogen storage reservoir, such as a tank including a high pressure tank. The membrane electrode assembly may pump the hydrogen to the reservoir and a compressor or pump and one or more valves may be used to increase the pressure within the reservoir. The source side of the membrane electrode assembly may receive ambient air and a filter may be used to remove any contaminates that might prematurely foul or de-active the catalyst. An air moving device, such as s fan or pump may force the source gas stream into the regenerative fuel cell.

An exemplary reservoir may comprise a metal hydride forming alloy, or a metal alloy that forms a metal hydride when it absorbs hydrogen. The metal hydride may be configured or coupled with the membrane electrode assembly of the regenerative fuel cell. In an exemplary embodiment, the electrode on the storage side of the membrane electrode assembly is an integral metal hydride electrode that comprises a metal hydride forming alloy.

In an exemplary embodiment, a metal hydride heat transfer system is coupled with or integrated with the regenerative fuel cell, as described herein. Exemplary metal hydride heat transfer systems are described in U.S. patent application Ser. No. 15/403,299, filed on Jan. 11, 2017 and entitled, Advanced Metal Hydride Heat Transfer Systems Utilizing An Electrochemical Compressor, to Xergy Inc., the entirety of which is incorporated by reference herein. The regenerative fuel cell of the present invention may provide hydrogen to a metal hydride heat transfer system or may act as one of the heat transfer devices of the metal hydride heat transfer system. A metal hydride heat transfer system may leak hydrogen and a regenerative fuel cell system, as described herein may provide make up hydrogen as required.

An exemplary membrane electrode assembly may comprise an ion conducting layer, such as a cationic conductive material that can transport protons. An example of such a material is an ionomer. An exemplary ion conducting layer may be thin to improve the rate of transport of protons and may comprise a support material to enable very thin layers. For example, a support material may comprise a fluoropolymer material that is porous, such as an expanded polytetrafluoroethylene.

It is important to recognize that metal hydride need specific pressures to absorb hydrogen, and other specific pressures, generally lower than the absorption pressures to desorb the hydrogen. The ratio of the absorption to desorption pressure Higher efficiencies are gained when the pressure ratio of the pressure of the output gas to the pressure of the incoming gas is minimized. In one embodiment, the pressure ratio of the electrochemical compressor is as high as 20 or more, or about 30 or more, 35 or more and any range between and including the pressure ratios provided. However, lower ratios are better, and more efficient, wherein they require less power. Some metal hydrides such as those in Tables 1 to 4. LaNi4.8Al02 are reported to have P(low) of 2.47 atmospheres and a P(high) of 35.84 atmospheres, a pressure ratio requirement of 14.51; another hydride Mm Ni(4.7) Fe(0.3) has a P(L) of 1.29 atmospheres and a P(H) of 12.14 i.e. a ratio of 9.41.

TABLE 1

| COMPOSITION | A | B | COMPOUNDS |
| --- | --- | --- | --- |
| $A_2B$ | Mg, Zr | Ni, Fe, Co | $Mg_2Ni$, $Mg_2Co$, $Zr_2Fe$ |
| AB | Ti, Zr | Ni, Fe | TiNi, TiFe, ZrNi |
| $AB_2$ | Zr, Ti, Y, La | V, Cr, Mn, Fe, Ni | $LaNi_2$, $YNi_2$, $YMn_2$, $ZrCr_2$, $ZrMn_2$, $ZrV_2$, $TiMn_2$ |
| $AB_3$ | La, Y, Mg | Ni, Co | $LaCo_3$, $YNi_3$, $LaMg_2Ni_9$ |
| $AB_5$ | Ca, La, Rare Earth | Ni, Cu, Co, Pt, Fe | $CaNi_5$, $LaNi_5$, $CeNi_5$, $LaCu_5$, $LaPt_5$, $LaFe_5$ |

TABLE 2

| Hydride | $\Delta H \cdot$ cal/mol | $\Delta S \cdot$ cal/mol $\cdot$ K | $\bar{m}_g \cdot$ g/mole |
|---|---|---|---|
| $V_{0.95}Cr_{0.01}$ | −8930 | −33.3 | 109.8 |
| $V_{0.925}Cr_{0.975}$ | −8680 | −33.4 | 128.3 |
| $V_{0.9}Cr_{0.1}$ | −7970 | −32.0 | 120.9 |
| NiZr | −7270 | −17.1 | 112.0 |
| $V_{0.83}Cr_{0.13}$ | −7100 | −30.0 | 347.3 |
| $MNi_{4.3}Al_{0.06}Fe_{0.05}$ | −7420 | −26.5 | 290.0 |
| $LaNi_5$ | −7380 | −25.8 | 175.8 |
| $Fe_{0.85}Mn_{0.15}Ti$ | −7040 | −25.6 | 220.0 |
| $PrNi_5$ | −6940 | −28.5 | 220.0 |
| $MNi_{4.5}Al_{0.03}$ | −6700 | −25.2 | 281.2 |
| FeTi | −6700 | −25.3 | 242.4 |
| $NdNi_5$ | −6650 | −27.8 | 167.8 |
| $MNi_{4.13}FE_{0.83}$ | −6000 | −25.0 | 308.4 |
| $Zr(Fe_{0.73}Cr_{0.25})_2$ | −5920 | −21.9 | 206.2 |
| $Ca_{0.7}M_{0.3}Ni_5$ | −6400 | −24.0 | 168.8 |
| $Ca_{0.5}M_{0.5}Ni_5$ | −6160 | −24.8 | 168.8 |
| $Ca_{0.4}M_{0.6}Ni_5$ | −6040 | −25.2 | 168.8 |
| $Ca_{0.2}M_{0.8}Ni_5$ | −5800 | −26.0 | 168.8 |
| $Ce_{0.5}La_{0.5}Ni_{2.5}Cu_{2.5}$ | −5500 | −20.7 | 393.0 |
| $CeNi_5$ | −5300 | −26.7 | 198.5 |
| $CeNi_{4.5}Al_{0.5}$ | −5230 | −22.0 | 220.1 |
| $MNi_5$ | −5000 | −23.1 | 203.1 |
| $ZrMn_2Cu_{0.3}$ | −6170 | −13.8 | 175.0 |
| $ZrMn_{3.0}$ | −4710 | −14.7 | 200.0 |
| $ZrMn_{2.0}$ | −4400 | −12.5 | 200.0 |
| $Zr_{0.5}Ti_{0.2}MnFe$ | −2660 | −9.4 | 175.0 |

TABLE 3

| Alloys used | Type | Mass (kg) | Capacity (kW) | COP |
|---|---|---|---|---|
| $LaNi_5/MmNi_{4.15}Fe_{0.85}$ | R | 3.6 | 0.6 | — |
| $LaNi_{4.7}Al_{0.3}/MmNi_{4.15}Fe_{0.85}/$ | R | 3.6 | 0.6 | — |
| $LaNi_{4.7}Al_{0.3}/LaNi_{4.85}Al_{0.15}$ | R | 90 | — | 0.42 |
| $LaNi_{4.65}Al_{0.35}/MmNi_4Fe$ | R | 40 | 1.75 | — |
| $LaNi_{4.65}Al_{0.35}/MmNi_4Fe$ | R | 40 | 1.3 | 0.3 |
| $LaNi_{4.7}Al_{0.3}/MmNi_{4.17}Fe_{0.55}$ | R | 90 | 22.8 | — |
| $LaNi_5/LaNi_{4.7}Al_{0.3}$ | HP | 20 | 0.6 | — |
| $LaNi_{4.7}Al_{0.3}/MmNi_{4.85}Fe_{0.35}$ | HP | 1.0 | — | — |
| MmNiMnAl/MmNiMnCo | HP | 64 | 3.0 | — |
| $MmNi_{4.4}Mn_{0.5}Al_{0.05}Co_{0.05}$ | R | 48 | 4.6 | — |
| $MmNi_{4.7}Mn_{0.35}Lm_{0.95}Ni_5$ | | | | |
| $LaNi_{4.5}Al_{0.5}/(CFM)Ni_5$ | R | 2.6 | — | 0.33 |
| $Zr_{0.9}Ti_{0.3}Cr_{0.9}Fe_{1.1}/$ | R | 4.5 | 0.683 | — |
| $Zr_{0.9}Ti_{0.1}Cr_{0.6}Fe_{1.4}$ | | | | |
| $ZrMnFe/MmNi_{4.5}Al_{0.5}$ | R | 1.5 | 0.1 | 0.2−0.4 |
| $LaNi_{4.7}Al_{0.3}/MmNi_{4.15}Fe_{0.85}$ | R | — | — | — |
| $LaNi_{4.5}Al_{0.4}/MmNi_{4.15}Fe_{0.15}$ | HP | 3.0 | 0.15−0.2 | .17−0.2 |
| $LaNi_5$ | C | 1 | 1.5 (150 S cooling) | — |
| $Ca_{0.4}Mm_{0.5}Ni_5$ | C | 1 | 2.2 (150 s cooling) | — |
| $LaNi_{4.5}Al_{0.4}$ $MmNi_{4.15}Fe_{0.85}$ | R | 3 | 0.15 | — |
| $Zr_{0.9}Ti_{0.3}Cr_{0.55}Fe_{1.45}$ | C | 1 | 0.41 | 1.8 |

TABLE 5

| alloy | $\Delta H$ | $\Delta S$ | $c_L$ | $c_8$ | $d(\ln P_d)/dc$ | $\ln(P_d/P_d)$ | M |
|---|---|---|---|---|---|---|---|
| $LaNi_5$ | 30.8 | 0.108 | 0.07 | 1 | 0.13 | 0.13 | 432.456 |
| $MmNi_{4.15}Fe_{0.85}$ | 25.3 | 0.105 | 0.1 | 0.75 | 0.36 | 0.17 | 431.373 |
| V | 40.1 | 0.1407 | 1 | 2 | 0.15 | 0.45 | 50.942 |
| $(V_{0.0}Ti_{0.1})_{0.95}Fe_{0.85}$ | 43.2 | 0.1396 | 1 | 1.95 | 0.45 | 0.8 | 50.898 |
| $CaNi_5$ | 31.9 | 0.101 | 0.2 | 0.75 | 0.19 | 0.16 | 333.63 |
| $LaNi_{4.7}Al_{0.3}$ | 34 | 0.1068 | 0.03 | 0.8 | 0.48 | 0.05 | 422.938 |
| $LaNi_{4.8}Sn_{0.2}$ | 32.8 | 0.105 | 0.03 | 0.95 | 0.22 | 0.19 | 444.452 |
| $TiFe_{0.8}Ni_{0.2}$ | 41.2 | 0.119 | 0.1 | 0.5 | 0.36 | 0.05 | 104.32 |

It is important to understand, that the metal hydride heating system, or heat pump described herein is not only interested in low pressure ratio metal hydrides for highest efficiency, but also materials that have heat/cool enthalpies, i.e. Kj/mol H2 absorbed or desorbed, and high hydrogen absorption, low density (weight), and also high recycling capacity The summary of the invention is provided as a general introduction to some of the embodiments of the invention and is not intended to be limiting. Additional example embodiments including variations and alternative configurations of the invention are provided herein.

DETAILED DESCRIPTION OF THE ILLUSTRATED EMBODIMENTS

Corresponding reference characters indicate corresponding parts throughout the several views of the figures. The figures represent an illustration of some of the embodiments of the present invention and are not to be construed as limiting the scope of the invention in any manner. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Figure 1:
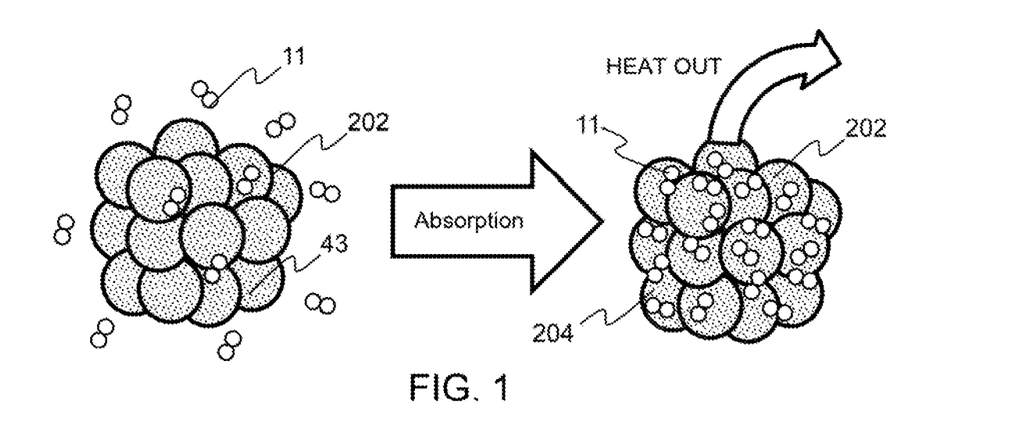
FIG. 1 shows metal hydride during absorption.
Figure 2:
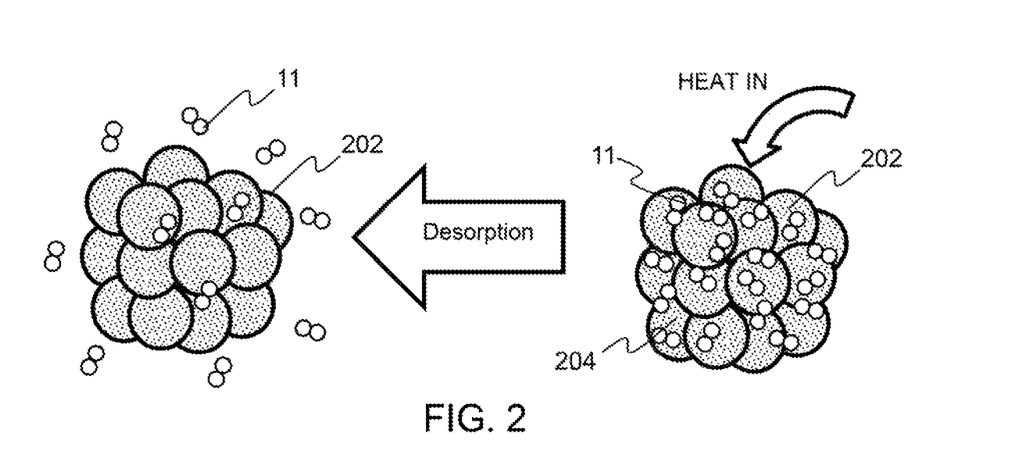
FIG. 2 shows metal hydride during desorption.

Referring to FIGS. 1 and 2, the absorption of hydrogen gas 11 into suitable metal alloy 202 leads to the exothermic formation of a metal hydride 204, producing useful heat as shown in FIG. 1 The endothermic desorption of hydrogen gas 11 is reversible, requiring about as much heat as that released by absorption, which thereby produces useful cooling, as shown in FIG. 2

Figure 3:
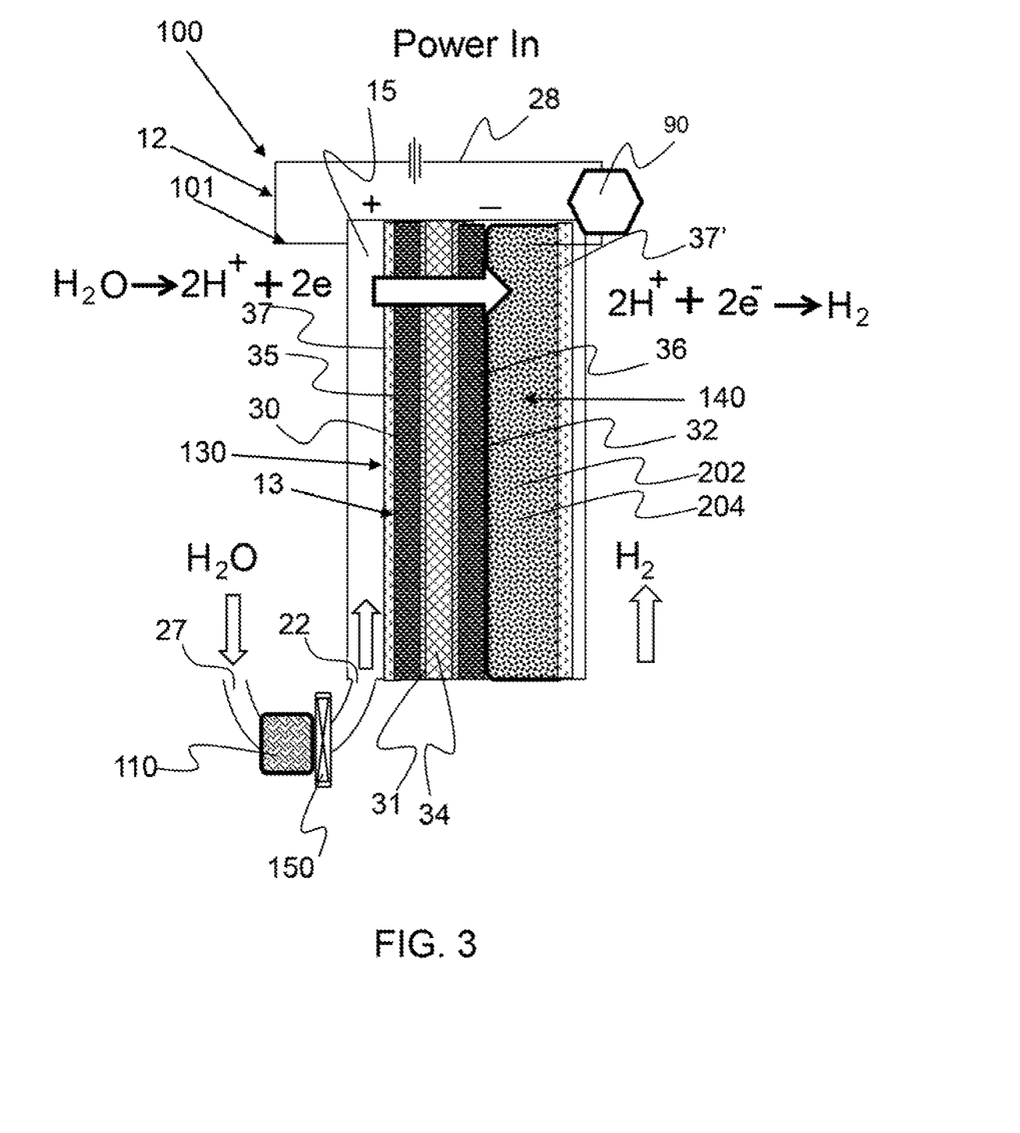
FIG. 3 shows an exemplary regenerative fuel cell system having a metal hydride coupled with the membrane electrode assembly in a hydrogen pumping mode.

As shown in FIG. 3, an exemplary regenerative fuel cell system 100 comprises a regenerative fuel cell 101 that has a metal hydride 204 coupled with the membrane electrode assembly 13 in a hydrogen pumping mode. In a hydrogen pumping mode, water vapor, such as from the ambient air in introduced to the anode side 35, or source side 130, of the membrane electrode assembly. Any incoming air or gas stream may be filtered by a filter 110 and may be forced into an enclosure by an air moving device 150, such as a fan. The anode 30 having an electrical potential reacts with the water to produce to protons and electrons. The protons move across the proton conducting layer 31 that comprises an ionomer 34, to the cathode 32 on the cathode side 36, or storage side 140, of the membrane electrode assembly. The hydrogen is reformed on the cathode 32 and is absorbed by the metal alloy 202 to form metal hydride 204. In the hydrogen pumping mode, the membrane electrode assembly acts as an electrochemical compressor 12 for hydrogen, or a hydrogen pump 15, comprising a power source 28 and controller 90. The fluid or gas stream may enter into the system through a conduit 27 having an inlet 22 to the anode side. The equations of reaction are shown for the anode and cathode. Note that the metal hydride 204 may be spaced apart from, adjacent to, or attached to the cathode on the cathode side. A membrane electrode assembly may comprise a gas diffusion layer 37, 37'.

Figure 4:
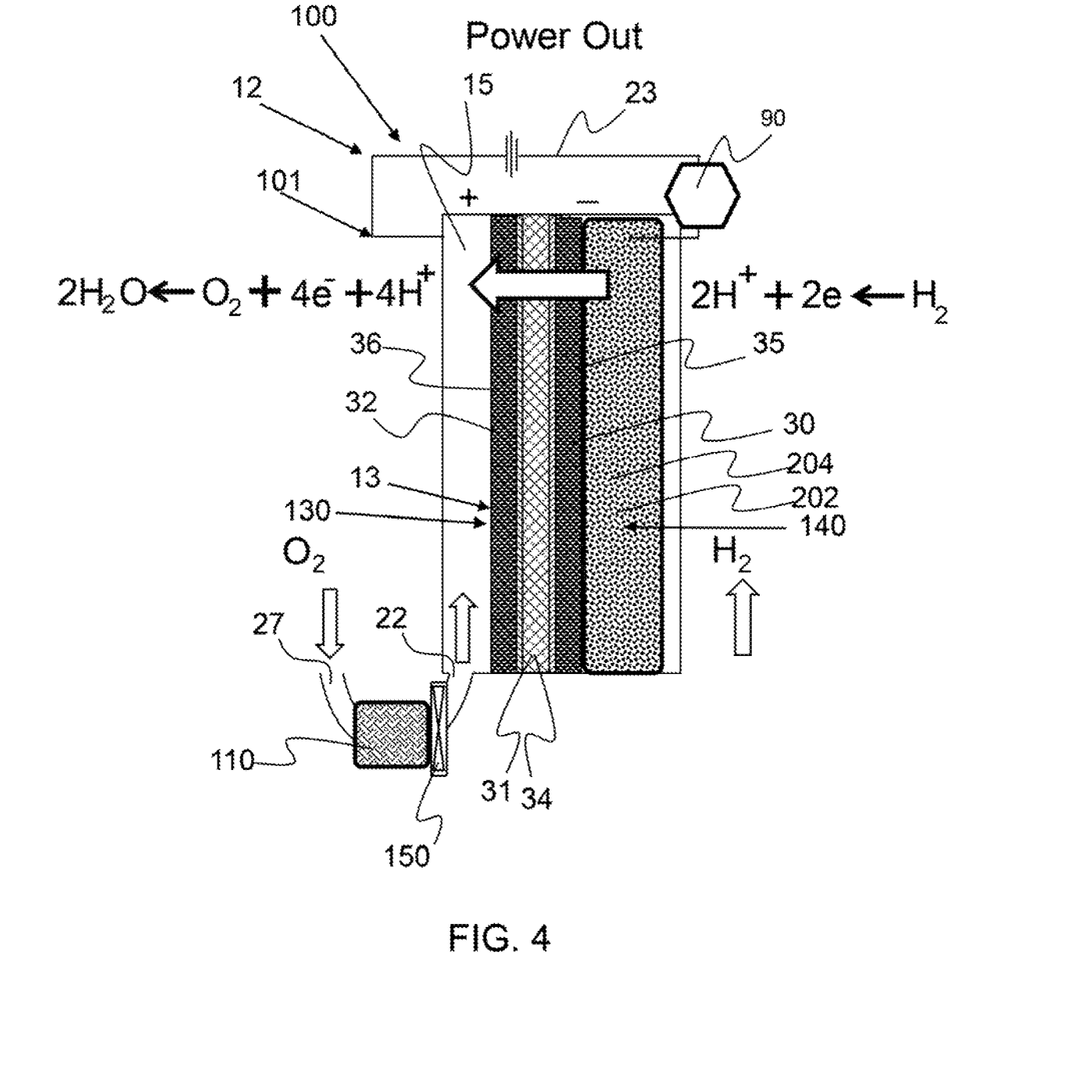
FIG. 4 shows the exemplary regenerative fuel cell system shown in FIG. 3 in a fuel cell mode, wherein power is being produced.

As shown in FIG. 4, the exemplary regenerative fuel cell system 100 shown in FIG. 3 is operating in a fuel cell mode, wherein power is being produced and being provided to a load 23. The hydrogen 11, from the metal hydride 204 is being reacted on the anode 30 to produce protons that pass through the proton conducting layer 31 to the cathode 32, wherein they are reacted with oxygen to produce water. The equations of the reactions on the anode and cathode are provided.

Figure 5:
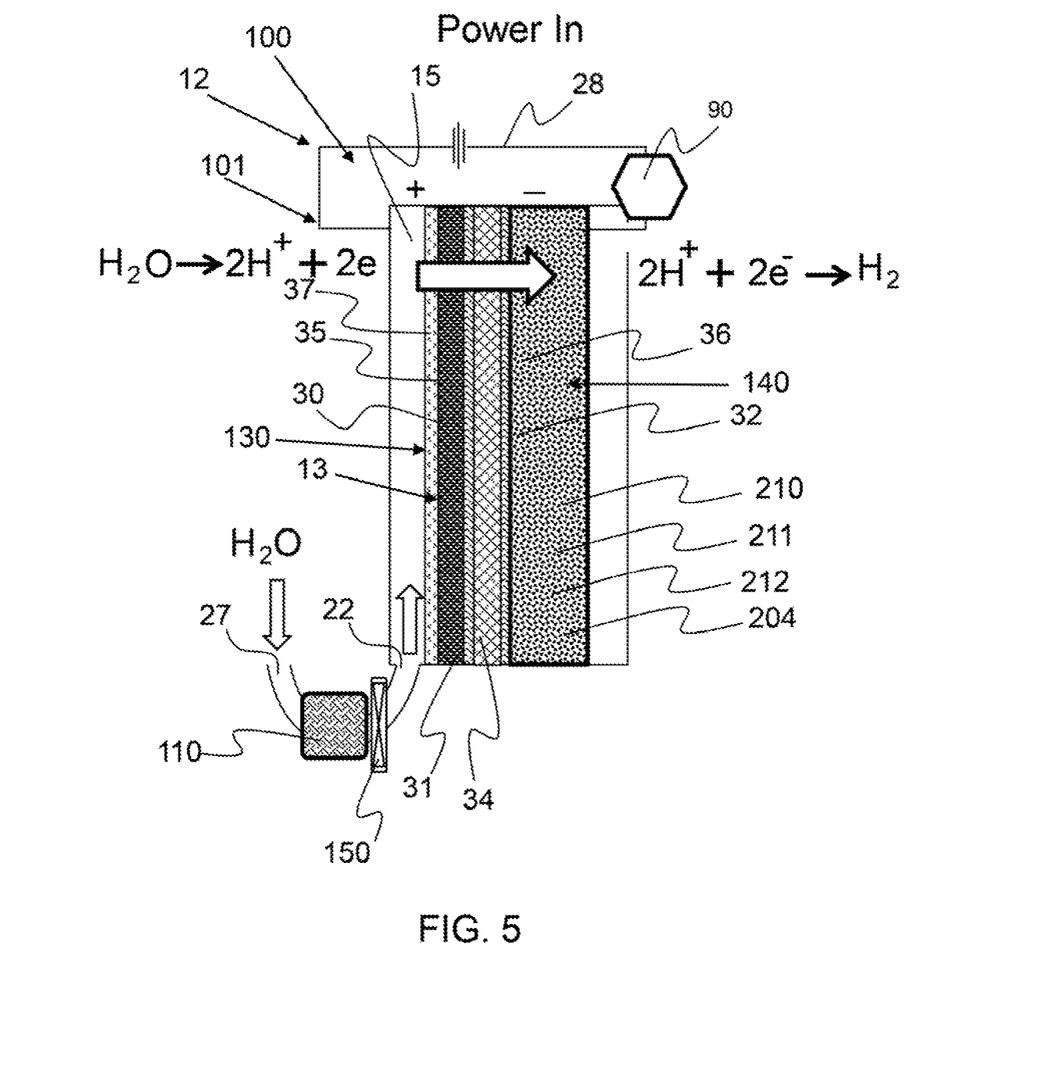
FIG. 5 shows an exemplary regenerative fuel cell system having an integral metal hydride electrode in a hydrogen pumping mode.

As shown in FIG. 5, an exemplary regenerative fuel cell system 100 comprises a regenerative fuel cell 101 having an integral metal hydride electrode 204 coupled with the membrane electrode assembly 13 in a hydrogen pumping mode. The integral metal hydride electrode comprises a metal hydride 204 or metal alloy 202, as described herein, and may comprise a catalyst 211 and/or ionomer 212. The metal hydride may be permeable or have pores to alloy coating of the catalyst and ionomer into a depth of the metal hydride. In an exemplary embodiment, the integral metal hydride electrode consists substantially of metal hydride and may have some ionomer penetrating into the depth of the integral metal hydride electrode. In a hydrogen pumping mode, water vapor, such as from the ambient air in introduced to the anode side 35, or source side 130, of the membrane electrode assembly. Any incoming air or gas stream may be filtered by a filter 110 and may be forced into an enclosure by an air moving device 150, such as a fan. The anode 30 having an electrical potential reacts with the water to produce to protons and electrons. The protons move across the proton conducting layer 31 that comprises an ionomer 34, to the cathode 32 on the cathode side 36, or storage side 140, of the membrane electrode assembly. The hydrogen is reformed on the cathode 32 and is absorbed by the metal alloy 202 to form metal hydride 204. In the hydrogen pumping mode, the membrane electrode assembly acts as an electrochemical compressor 12 for hydrogen, or a hydrogen pump 15, comprising a power source 28 and controller 90. The fluid or gas stream may enter into the system through a conduit 27 having an inlet 22 to the anode side. The equations of reaction are shown for the anode and cathode. Note that the metal hydride 204 may be spaced apart from, adjacent to, or attached to the cathode on the cathode side.

Figure 6:
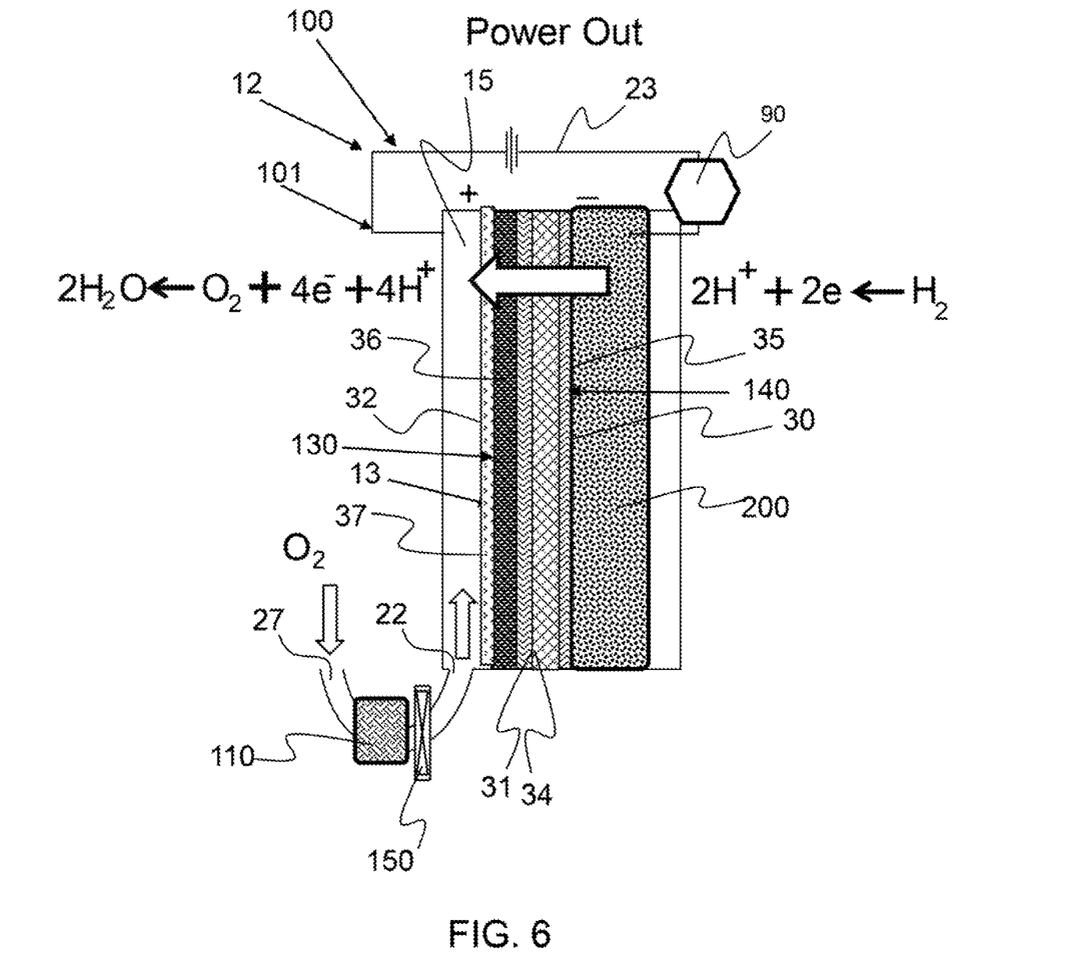
FIG. 6 shows the exemplary regenerative fuel cell system shown in FIG. 5 in a fuel cell mode, wherein power is being produced.

As shown in FIG. 6, the exemplary regenerative fuel cell system 100 shown in FIG. 5 is operating in a fuel cell mode, wherein power is being produced and being provided to a load 23. The hydrogen 11, from the integral metal hydride electrode 210 is being reacted on the anode 30 to produce protons that pass through the proton conducting layer 31 to the cathode 32, wherein they are reacted with oxygen to produce water. The equations of the reactions on the anode and cathode are provided.

Figure 7:
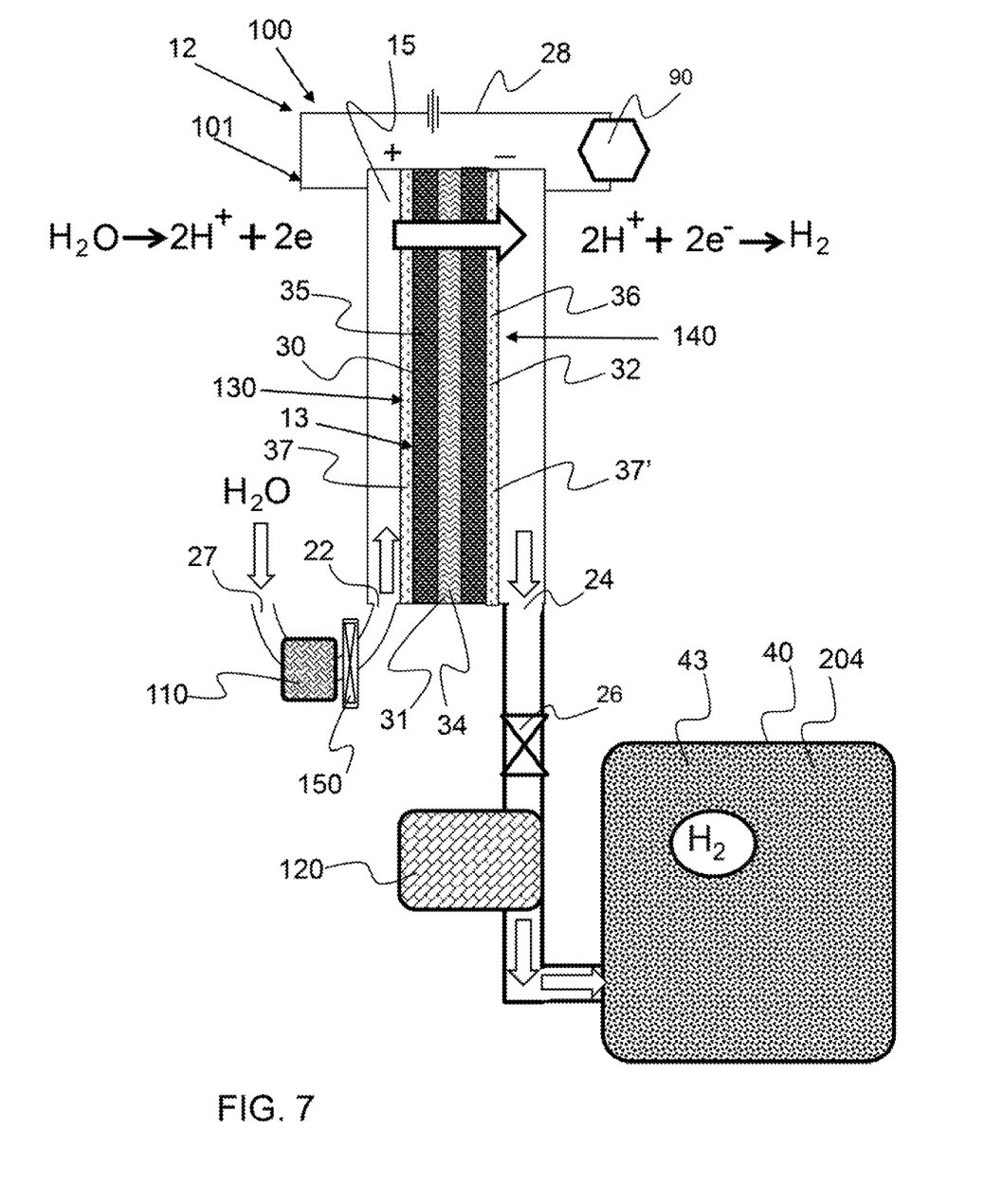
FIG. 7 shows an exemplary regenerative fuel cell system in a hydrogen pumping mode wherein the hydrogen produced is stored in a reservoir.

As shown in FIG. 7, an exemplary regenerative fuel cell system 100 comprises a regenerative fuel cell 101 operating in a hydrogen pumping mode wherein the hydrogen produced is pumped through an outlet 24 from the cathode side 36 and is stored in a reservoir 40. The reservoir may be a tank and may comprise hydride forming allow 43, or metal hydride 204. A valve 26 may control the flow of hydrogen to and from the reservoir. A compressor or pumping device 120 may increase the pressure of hydrogen in the reservoir. The membrane electrode assembly 13 may operate as a hydrogen pump 15 when operating in a hydrogen pumping mode and may pump hydrogen to an increased pressure within the reservoir.

Figure 8:
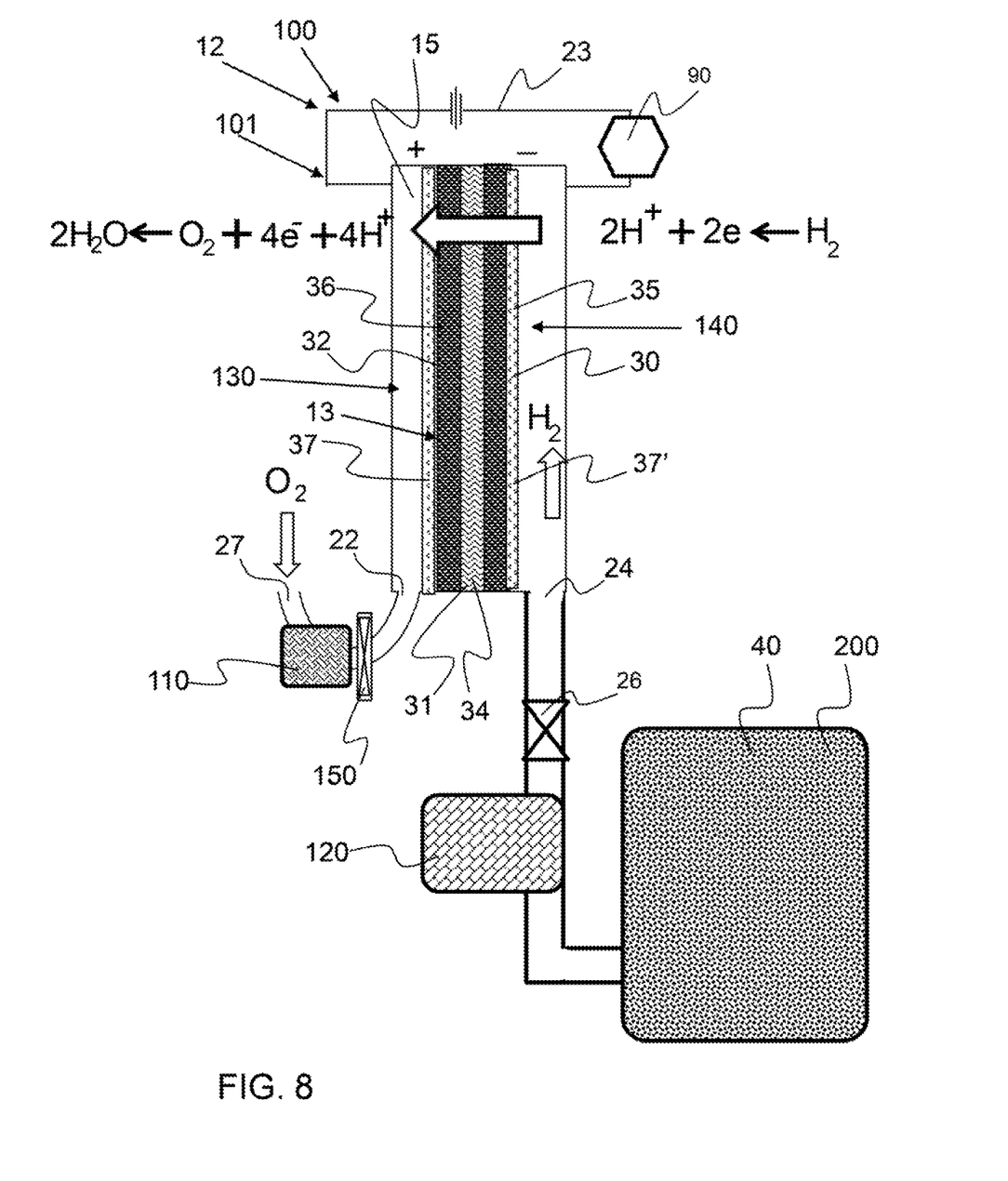
FIG. 8 shows the exemplary regenerative fuel cell system shown in FIG. 7 in a fuel cell mode, wherein power is being produced.

As shown in FIG. 8, the exemplary regenerative fuel cell system 100 shown in FIG. 7 is operating in a fuel cell mode, wherein power is being produced and being provided to a load 23.

Figure 9:
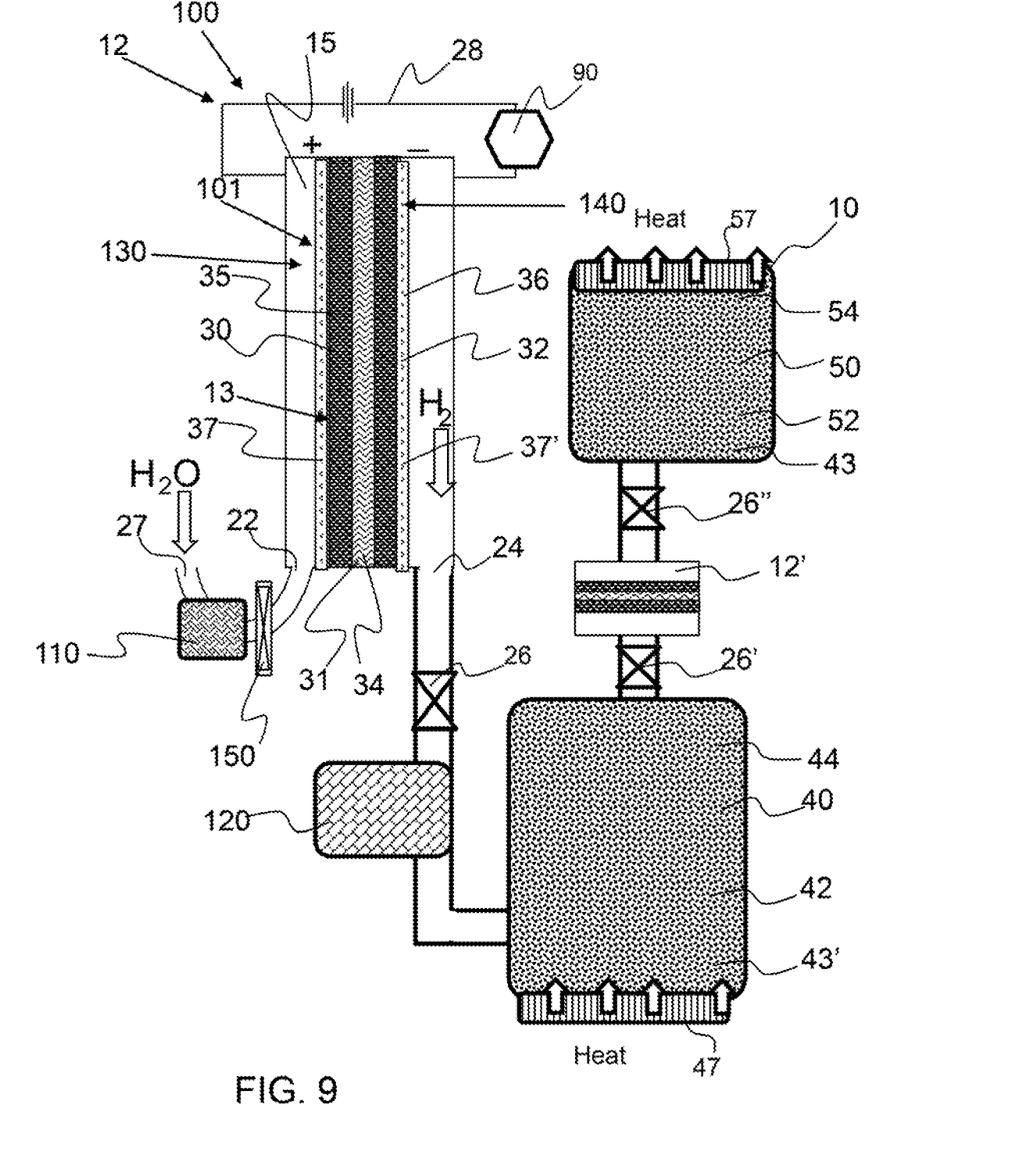
FIG. 9 shows an exemplary regenerative fuel cell system that supplying hydrogen to a metal hydride heat transfer system having two reservoirs

As shown in FIG. 9, an exemplary regenerative fuel cell system 10 comprises a regenerative fuel cell 101 that is supplying hydrogen to a first reservoir 40 having a metal hydride forming alloy 43. The first reservoir is coupled to a second reservoir 50 also containing a metal hydride forming alloy 43'. An electrochemical compressor 12' and valves 26', 26" are configured between the two metal hydride reservoirs that act as heat transfer devices in an electrochemical heat transfer device 10. The first reservoir 40, or first heat transfer device 44, contains a first metal hydride forming alloy 42 that may be different or the same as the second metal hydride forming allow 52 in the second heat transfer device 54. A heat exchanger 47 may be coupled with the first heat transfer device 44 and a second heat exchanger 57 may be coupled with the second heat transfer device 54. As the electrochemical compressor 12' pumps the hydrogen from one reservoir to the other, heat is produce in the reservoir receiving the hydrogen and heat is lost from the reservoir from which it is pumped.

Figure 10:
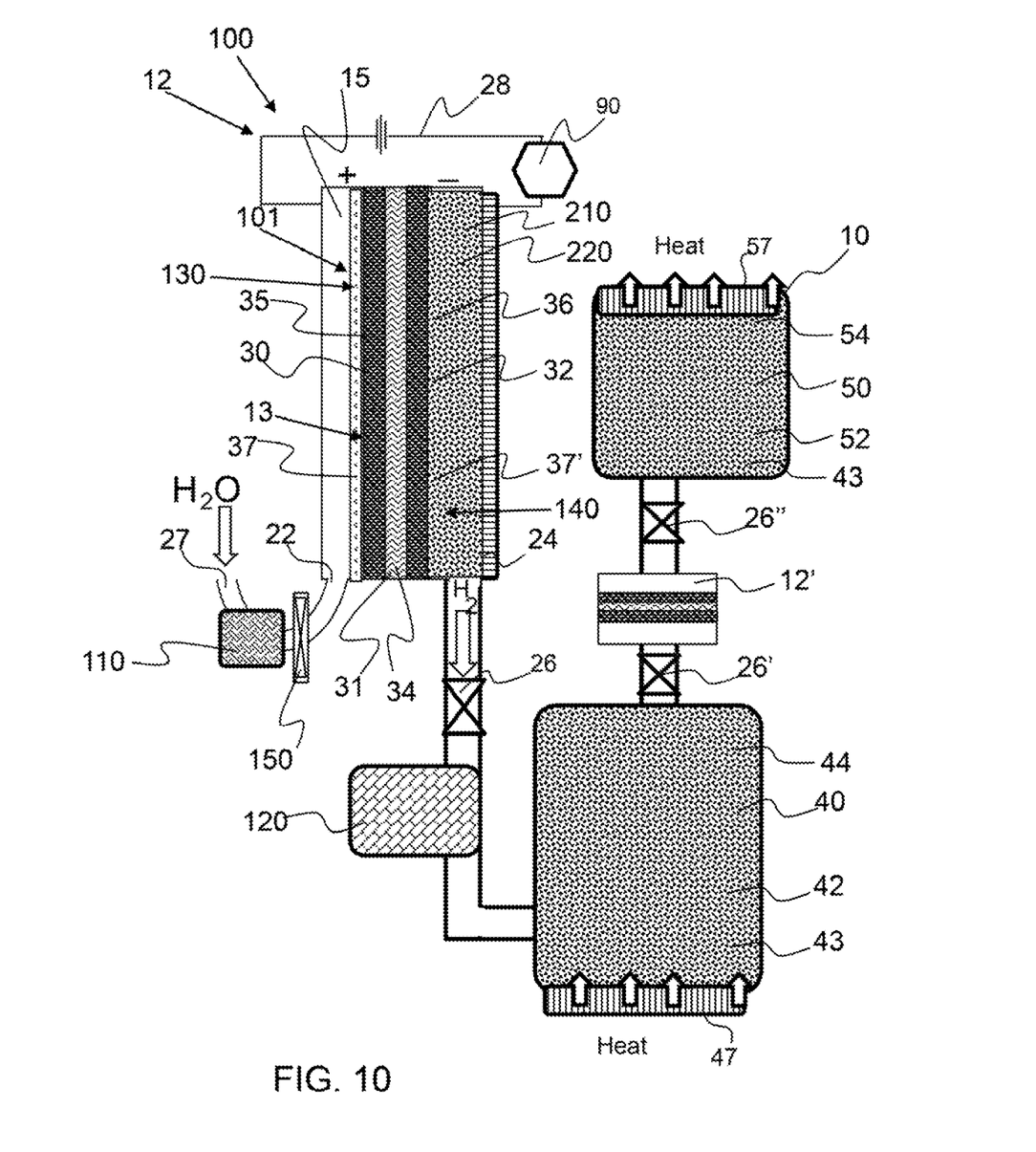
FIG. 10 shows an exemplary regenerative fuel cell system having an integral metal hydride electrode that is a heat transfer device and that is supplying hydrogen to a metal hydride heat transfer system having two reservoirs.

As shown in FIG. 10, an exemplary regenerative fuel cell system 100 comprises a regenerative fuel cell 101 having an integral metal hydride electrode 210 that is an integral heat transfer device 220 that is coupled with the membrane electrode assembly 13 or regenerative fuel cell 101, and that is supplying hydrogen to a metal hydride heat transfer system having two reservoirs.

Certain exemplary embodiments of the present invention are described herein and are illustrated in the accompanying figures. The embodiments described are only for purposes of illustrating the present invention and should not be interpreted as limiting the scope of the invention. Other embodiments of the invention, and certain modifications, combinations, and improvements of the described embodiments, will occur to those skilled in the art and all such alternate embodiments, combinations, modifications, improvements are within the scope of the present invention.

What is claimed is:
1. A regenerative fuel cell system comprising:
   a) a regenerative fuel cell comprising:
      i) a membrane electrode assembly comprising:
         a proton conducting layer comprising an ion conductive media;
         an anode; and
         a cathode;
      wherein the proton conducting layer is onfigured between the anode and cathode;
   b) a hydrogen storage reservoir oupled with a storage side of the membrane electrode assembly when the regenerative fuel cell operates in a hydrogen pumping mode;
   c) a power supply that provides an electrical potential between the anode and cathode when operating in the hydrogen pumping mode;
   wherein in said hydrogen pumping mode, the anode is exposed to air and humidity in said air, and said humidity is reacted on the anode to produce protons that move across the proton conducting layer to the cathode where the protons are reacted to form pumped hydrogen that is stored in the hydrogen storage reservoir, and in a fuel cell mode, the anode is exposed to the pumped hydrogen and the pumped hydrogen is reacted on the anode to produce protons that move across the proton conducting layer to the cathode where the protons are reacted with oxygen to form water.

2. The regenerative fuel cell system of claim 1, wherein the air is ambient air.

3. The regenerative fuel cell system of claim herein the hydrogen storage reservoir comprises a metal hydnde forming alloy.

4. The regenerative fuel cell system of claim 1, comprising an integral metal hydride electrode as the cathode when operating the in the hydrogen pumping mode and wherein the integral metal hydride electrode comprises a metal hydride forming alloy.

5. The regenerative fuel cell system of claim 4, wherein the integral metal hydride electrode is attached to the proton conducting layer.

6. The regenerative fuel cell system of claim 4, wherein the integral metal hydride electrode is attached to the proton conducting layer and wherein the ion conducting media penetrates into the integral metal hydride electrode.

7. The regenerative fuel cell system of claims 4, wherein the integral metal hydride electrode comprises a catalyst.

8. The regenerative fuel cell system of claim 7 wherein the catalyst is coated onto the metal hydride forming alloy.

9. The regenerative fuel cell system of claim 1, compris compressor between the regenerative fuel cell and the hydrogen storage reservoir.

10. The regenerative fuel cell system of claim 9, wherein the compressor is an electrochemical compressor comprising a membrane electrode assembly.

11. The regenerative fuel cell system of claim 1, comprising a pump between the regenerative fuel cell and the hydrogen storage reservoir.

12. The regenerative fuel cell system of claim 1, comprising a filter to filter incoming fluid to a source side of the membrane electrode assembly of the regenerative fuel cell.

13. The regenerative fuel cell system of claim 1, comprising an air moving device force incoming fluid to a source side of the membrane electrode assembly of the regenerative fuel cell.

14. The regenerative fuel cell system of claim 1, comprising gas diffusion media coupled with the anode.

15. The regenerative fuel cell system of claim 1, comprising gas diffusion media coupled with the cathode.

16. The regenerative fuel cell system of claim 1, further comprising an electrochemical heat transfer device.

17. The regenerative fuel of cell system of claim 16, comprising a heat exchanger coupled with the regenerative fuel cell.

18. The regenerative fuel cell system of claim 16, wherein the electrochemical heat transfer device comprises a first reservoir comprising a metal hydride forming alloy that is coupled with and receives hydrogen from the regenerative fuel cell, and wherein heat is generated when hydrogen is pumped to the first reservoir and wherein heat is lost when hydrogen is pumped from the first reservoir.

19. The regenerative fuel of cell system of claim 18, wherein the hydrogen is pumped by the regenerative fuel cell to and from the first reservoir.

20. The regenerative fuel cell system of claim 18, wherein the electrochemical heat transfer device comprises said first reservoir comprising a first metal hydride forming alloy and a second reservoir comprising a second metal hydride forming alloy and wherein the second reservoir is coupled with and receives hydrogen from the regenerative fuel cell wherein the hydrogen is pumped by the regenerative fuel cell to and from the first reservoir and second reservoirs.

21. The regenerative fuel cell system of claim 20, further comprising an electrochemical compressor configured between the first and second reservoirs to pump hydrogen from the first reservoir to the second reservoir.

\* \* \* \* \*